US010291435B2

(12) United States Patent
Aoshima

(10) Patent No.: US 10,291,435 B2
(45) Date of Patent: May 14, 2019

(54) ROUTER DEVICE, PACKET CONTROL METHOD BASED ON PREFIX MANAGEMENT, AND PROGRAM

(75) Inventor: Tsutomu Aoshima, Kakegawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 575 days.

(21) Appl. No.: 13/992,905

(22) PCT Filed: Feb. 16, 2012

(86) PCT No.: PCT/JP2012/001028
§ 371 (c)(1),
(2), (4) Date: Jun. 10, 2013

(87) PCT Pub. No.: WO2012/114684
PCT Pub. Date: Aug. 30, 2012

(65) Prior Publication Data
US 2013/0259061 A1 Oct. 3, 2013

(30) Foreign Application Priority Data
Feb. 24, 2011 (JP) .................................. 2011-038873

(51) Int. Cl.
*H04L 12/54* (2013.01)
*H04L 29/12* (2006.01)
(Continued)

(52) U.S. Cl.
CPC .............. *H04L 12/56* (2013.01); *H04L 45/72* (2013.01); *H04L 61/2053* (2013.01);
(Continued)

(58) Field of Classification Search
CPC ...... H04L 12/56; H04L 45/72; H04L 12/6418; H04L 63/0236; H04L 12/66; H04L 61/2015; H04L 61/6059
See application file for complete search history.

(56) References Cited

U.S. PATENT DOCUMENTS

| 6,073,178 A | 6/2000 | Wong et al. |
| 6,240,464 B1 | 5/2001 | Fijolek et al. |

(Continued)

FOREIGN PATENT DOCUMENTS

| EP | 1349323 A1 | 10/2003 |
| JP | 2002-158701 A | 5/2002 |

(Continued)

OTHER PUBLICATIONS

Communication dated Mar. 14, 2017 from the Argentina National Institute of Industrial Property in counterpart Application No. P20120100606.

(Continued)

*Primary Examiner* — Noel R Beharry
*Assistant Examiner* — Wilfred Thomas
(74) *Attorney, Agent, or Firm* — Sughrue Mion, PLLC

(57) ABSTRACT

To prevent a packet including a prefix that should not be used from being forwarded. A router device 1 includes a prefix management unit 5 for creating a filtering rule including an indication of passage or block of a packet from a node 3 based on a prefix distributed from a prefix distributing device 2 and a prefix in a source IP address received from the node 3, and a filter unit 6 for passing or blocking the packet from the node according to the filtering rule created by the prefix management unit 5.

9 Claims, 11 Drawing Sheets

(51) Int. Cl.
*H04L 12/721* (2013.01)
*H04L 29/06* (2006.01)

(52) U.S. Cl.
CPC ...... *H04L 61/2092* (2013.01); *H04L 63/0236* (2013.01); *H04L 61/6059* (2013.01)

(56) References Cited

U.S. PATENT DOCUMENTS

| | | | | |
|---|---|---|---|---|
| 2002/0062485 | A1* | 5/2002 | Okano et al. | 725/111 |
| 2004/0111529 | A1* | 6/2004 | Parmar | 709/245 |
| 2005/0041671 | A1* | 2/2005 | Ikeda | H04L 29/12066 370/395.52 |
| 2005/0047348 | A1* | 3/2005 | Suzuki | H04L 29/12207 370/252 |
| 2005/0102415 | A1* | 5/2005 | Ishiyama | H04L 45/02 709/238 |
| 2005/0163051 | A1* | 7/2005 | Saito | H04L 45/06 370/235 |
| 2006/0036733 | A1* | 2/2006 | Fujimoto | H04L 61/2015 709/225 |
| 2007/0030855 | A1* | 2/2007 | Ribiere | H04L 45/02 370/401 |
| 2007/0133545 | A1* | 6/2007 | Tsuchino | H04L 29/12273 370/392 |
| 2007/0263548 | A1* | 11/2007 | Oguchi | H04L 45/02 370/248 |
| 2008/0307079 | A1* | 12/2008 | Choi | H04L 29/12358 709/223 |
| 2012/0044935 | A1* | 2/2012 | Hama | H04L 12/4625 370/389 |
| 2012/0063428 | A1* | 3/2012 | Ng | H04W 36/0016 370/338 |

FOREIGN PATENT DOCUMENTS

| | | |
|---|---|---|
| JP | 2006-303810 A | 11/2006 |
| JP | 2007-166097 A | 6/2007 |
| JP | 2007-251269 A | 9/2007 |
| WO | 2010022574 A1 | 3/2010 |

OTHER PUBLICATIONS

Communication dated Sep. 22, 2017 from the European Patent Office in counterpart European application No. 12749022.5.
Singh, H., et al., "Basic Requirements for IPv6 Customer Edge Routers; draft-ietf-v6ops-ipv6-cpe-router-09.txt", Internet Engineering Task Force, Dec. 2010, XP015073161, pp. 1-18 (18 pages).

* cited by examiner

FIG. 2

| EVENT | PREFIX STORAGE UNIT 170 | |
|---|---|---|
| | PREFIX | DELETE FLAG |
| Prefix 110 IS NOTIFIED FROM ROUTER ON WAN SIDE | 110 | 0 |
| ROUTER ON WAN SIDE HAS CHANGED PREFIX (Prefix 110→Prefix 111) | 110 | 1 |
| | 111 | 0 |
| AFTER RA TRANSMISSION | 111 | 0 |

FIG. 3

| | PROTOCOL | DIRECTION | SrcIP ADDRESS | DstIP ADDRESS | OPERATION WHEN RULE IS SUITED |
|---|---|---|---|---|---|
| 1 | IPv6 | IPv6 ROUTING UNIT 120 →IPv6 UNIT 112 | IP ADDRESS INCLUDING PREFIX THAT IS NOT DISTRIBUTED FROM HGW 101 TO NODE | any | DISCARD PACKET, AND NOTIFY PREFIX MANAGEMENT UNIT 160 OF SOURCE ADDRESS INFORMATION |

FIG. 6

| | PROTOCOL | DIRECTION | SrcIP ADDRESS | DstIP ADDRESS | OPERATION WHEN RULE IS SUITED |
|---|---|---|---|---|---|
| 1 | IPv6 | IPv6 UNIT 111→IPv6 ROUTING UNIT 120 | IP ADDRESS INCLUDING PREFIX THAT IS NOT DISTRIBUTED FROM HGW 102 TO NODE | any | DISCARD PACKET, AND NOTIFY PREFIX MANAGEMENT UNIT 160 OF SOURCE ADDRESS INFORMATION |

FIG. 8

| | PROTOCOL | DIRECTION | SrcIP ADDRESS | DstIP ADDRESS | OPERATION WHEN RULE IS SUITED |
|---|---|---|---|---|---|
| 1 | IPv6 | IPv6 ROUTING UNIT 120 →IPv6 UNIT 112 | IP ADDRESS INCLUDING PREFIX THAT IS NOT DISTRIBUTED FROM HGW 103 TO NODE | any | DISCARD PACKET, AND NOTIFY PREFIX MANAGEMENT UNIT 160 OF SOURCE ADDRESS INFORMATION |
| 2 | IPv6 | IPv6 ROUTING UNIT 120 →IPv6 UNIT 112 | IP ADDRESS INCLUDING PREFIX USED IN PACKET DISCARDED BY FILTER UNIT 130 | any | DISCARD PACKET, AND NOTIFY PREFIX MANAGEMENT UNIT 160 THAT PACKET HAS BEEN DISCARDED |

ROUTER DEVICE, PACKET CONTROL METHOD BASED ON PREFIX MANAGEMENT, AND PROGRAM

CROSS REFERENCE TO RELATED APPLICATIONS

This application is a National Stage of International Application No. PCT/JP2012/001028, filed on Feb. 16, 2012, which claims priority from Japanese Patent Application No. 2011-038873, filed on Feb. 24, 2011, the contents of all of which are incorporated herein by reference in their entirety.

TECHNICAL FIELD

The present invention relates to a router device to which a prefix of an IP address is distributed by prefix delegation, and a packet control method and program based on prefix management in the router device.

BACKGROUND ART

As a method of automatically setting an IP address of a node in a communication network conforming to IPV6 (Internet Protocol Version 6), there is a method of distributing an address using DHCPv6 (Dynamic Host Configuration Protocol version 6).

Methods of distributing an address using DHCPv6 includes a method in which a DHCP server or an upper router having a DHCP function uses RA (Router Advertisement) to distribute a prefix of an IP address to a router device (for example, see Patent Literature 1,2).

The router device to which a prefix is distributed redistributes the prefix to a node using RA, for example. The node communicates with the upper router using an IP address including the distributed prefix. For example, the upper router is connected to the Internet.

CITATION LIST

Patent Literature

PTL 1: JP 2007-166097 A
PTL 2: JP 2007-251269 A

SUMMARY OF INVENTION

Technical Problem

FIG. 13 is a block diagram showing an example of a communication system including a home gateway (HGW) as a router device. An upper router (hereinafter referred to as "router") 200 is, for example, installed by an Internet service provider (ISP) to be accessible to the Internet 400. HGW 100 is set up on the premises to be communicable with the router 200 through a WAN (Wide Area Network) 21. The WAN 21 is, for example, a subscriber's network. The HGW 100 is communicable with one or more nodes 300 through a LAN 11 to relay communication between each node 300 and the router 200. As an example, the node 300 is a personal computer.

The router 200 distributes a prefix to the HGW 100 based on a DHCP-PD (Prefix Delegation) function periodically or in response to a request from the HGW 100. The HGW 100 redistributes the prefix to the node 300. The node 300 combines the prefix with its own link-local address to generate an IP address. The node 300 performs communication using the generated IP address.

There is an unfixed method to change prefixes to be distributed to the router 200 with time or the like as well as a fixed method not to change the prefix to be distributed to the router 200.

The following will consider the operation of the HGW 100 and the node 300 when the prefix distributed from the router 200 to the HGW 100 is changed. As shown in FIG. 13, suppose that a prefix as Prefix 110 is changed to Prefix 111. In this case, the HGW 100 modifies the contents of an RA packet to be sent to the node 300. In other words, the HGW 100 deletes Prefix 110 and sends the node 300 a packet indicative of the distribution of Prefix 111.

When the node 300 cannot receive the packet the contents of which were modified, the node 300 holds Prefix 110 as the prefix until the life time has elapsed. Under such a circumstance, the node 300 cannot communicate with the router 200 or perform communication through the Internet 400.

Further, there is a possibility that the HGW 100 forwards an IP address including Prefix 110 sent from the node 300, i.e., that a false prefix is advertised.

It is an exemplary object of the present invention to provide a router device, and a packet control method and program based on prefix management, which can prevent forwarding of a packet including a prefix that should not be used.

Solution to Problem

A router device according to the present invention is a router device for reassigning, to a node, a prefix assigned from a prefix assigning device to route a packet based on an IPv6 address, characterized by including: a prefix management unit for creating a filtering rule including an indication of passage or block of a packet from the node based on the prefix distributed from the prefix distributing device and a prefix in a source IP address received from the node; and a filter unit for passing or blocking the packet from the node according to the filtering rule created by the prefix management unit.

A packet control method based on prefix management according to the present invention is a packet control method based on prefix management performed by a router device for redistributing, to a node, a prefix distributed from a prefix distributing device to route a packet based on an IPv6 address, characterized by including: creating a filtering rule including an indication of passage or block of a packet from the node based on the prefix distributed from the prefix distributing device and a prefix in a source IP address received from the node; and passing or blocking the packet from the node according to the created filtering rule.

A packet control program based on prefix management according to the present invention is a packet control program based on prefix management, which is installed in a router device for redistributing, to a node, a prefix distributed from a prefix distributing device to route a packet based on an IPv6 address, characterized by causing a computer in the router device to perform: a process to create a filtering rule including an indication of passage or block of a packet from the node based on the prefix distributed from the prefix distributing device and a prefix in a source IP address received from the node; and a process to pass or block the packet from the node according to the created filtering rule.

Advantageous Effects of Invention

According to the present invention, forwarding of a packet including a prefix that should not be used can be prevented.

BRIEF DESCRIPTION OF DRAWINGS

FIG. 2 It depicts an explanatory diagram showing an example of the relationships between events that have occurred and information stored in a prefix storage unit.

FIG. 3 It depicts an explanatory diagram showing an example of a filtering rule.

FIG. 6 It depicts an explanatory diagram showing an example of a filtering rule.

FIG. 8 It depicts an explanatory diagram showing an example of a filtering rule.

DESCRIPTION OF EMBODIMENTS

Exemplary embodiments of the present invention will now be described with reference to the accompanying drawings.

Exemplary Embodiment 1

Figure 1:
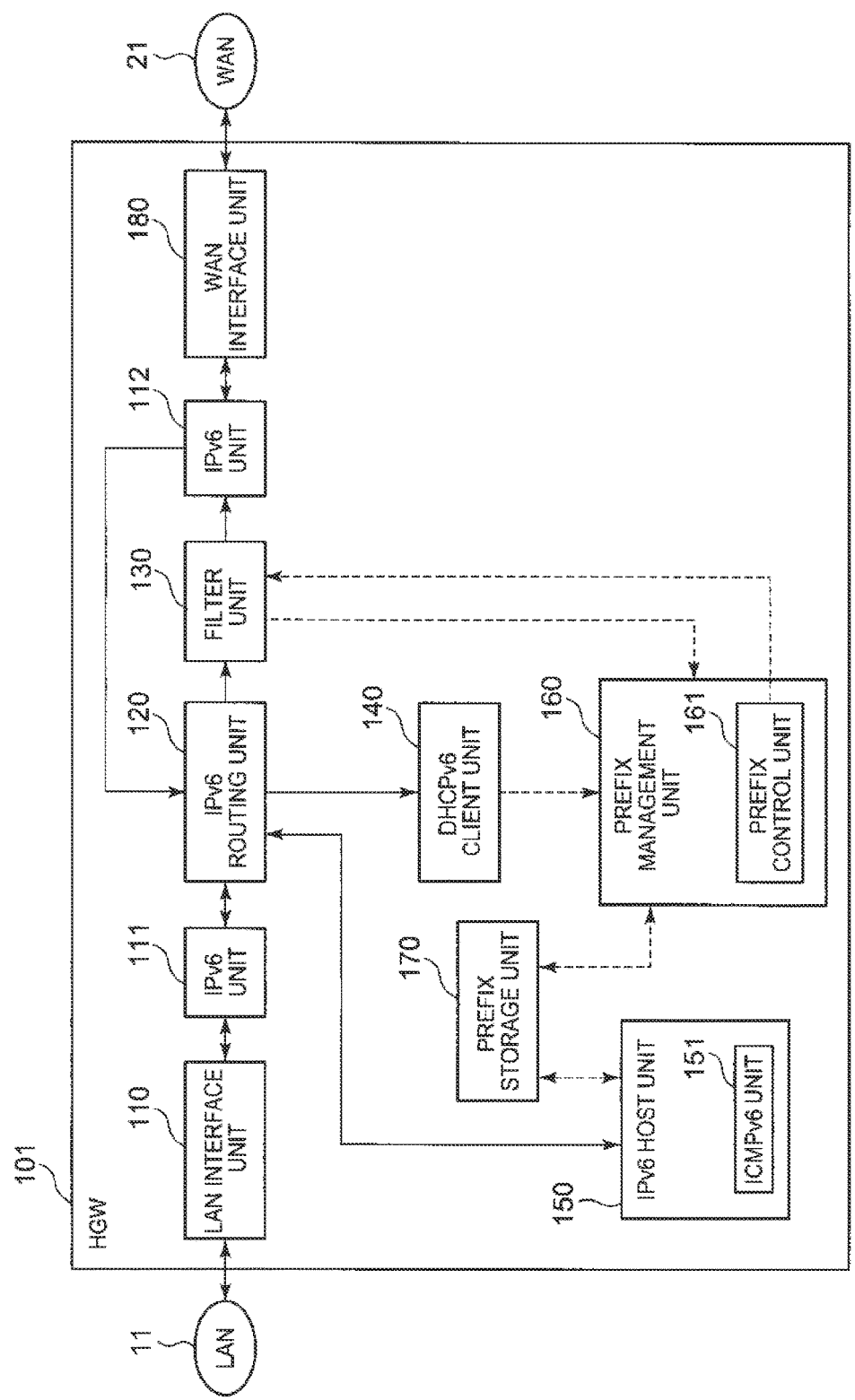
FIG. 1 It depicts a block diagram showing a first exemplary embodiment of a router device according to the present invention.

FIG. 1 is a block diagram showing a first exemplary embodiment of a router device according to the present invention. FIG. 1 shows HGW 101 as an example of the router device. The configuration of a communication system including the HGW 101 may be the same as that in the example shown in FIG. 13.

The HGW 101 includes a LAN interface unit 110 connected to LAN 11, an IPv6 unit (LAN-side IPv6 unit) 111 for sending and receiving IPv6 packets through the LAN 11, an IPv6 unit (WAN-side IPv6 unit) 112 for sending and receiving IPv6 packets through WAN 21, an IPv6 routing unit 120 for performing routing control on IPv6 packets, a filter unit 130 for controlling passage/block of data, a DHCPv6 client unit 140 having a DHCPv6 client function, an IPv6 host unit 150 having an IPv6 function such as DNS (Domain Name System) or the like, a prefix management unit 160 for managing prefixes, a prefix storage unit 170 for storing prefix information, and a WAN interface unit 180 connected to the WAN 21.

The HGW 101 may also have an IPv4 function for realizing IPv4 communications in addition to the IPv6 function.

The LAN interface unit 110 is connected to a home network (LAN 11) to receive, through the LAN 11, each of packets whose address in the Layer 2 header is an address on the LAN 11 side or a multicast address. Further, the LAN interface unit 110 sends packets output by the IPv6 unit 111 to the LAN 11.

The WAN interface unit 180 is connected to a router 200 (see FIG. 13) through a subscriber network (WAN 21). The WAN interface unit 180 receives, through the WAN 21, each of packets whose address in the Layer 2 header is an address on the LAN 11 side or a multicast address. Further, the WAN interface unit 180 sends packets output by the IPv6 unit 112 to the WAN 21.

The IPv6 unit 111 outputs packets received by the LAN interface unit 110 to the IPv6 routing unit 120. The IPv6 unit 111 outputs, to the LAN interface unit 110, packets output by the IPv6 routing unit 120.

The IPv6 unit 112 outputs, to the filter unit 130, IPv6 packets received by the WAN interface unit 180. The IPv6 unit 112 outputs, to the WAN interface unit 180, packets output by the filter unit 130.

The IPv6 routing unit 120 inputs packets from the IPv6 unit 111, the filter unit 130, the IPv6 host unit 150, and the DHCPv6 client unit 140. Based on a destination IPv6 address of each packet, a port number, and received interface information, the IPv6 routing unit 120 identifies a block in the HGW 101 in which the input packet should be processed. The IPv6 routing unit 120 outputs the packet into the identified block.

The DHCPv6 client unit 140 has a DHCPv6 client function. The DHCPv6 client unit 140 exchanges DHCPv6 messages with the router 200 (see FIG. 13) through the IPv6 routing unit 120 and the WAN 21. The DHCPv6 client unit 140 extracts prefix information included in a DHCP-PD option in a DHCP Reply message, and outputs the prefix information to the prefix management unit 160.

Based on the prefix information input from the DHCPv6 client unit 140, the prefix management unit 160 decides on prefix information to be informed to the LAN 11 side. The prefix management unit 160 outputs the decided prefix information into the prefix storage unit 170.

The prefix storage unit 170 stores the prefix information. Together with the prefix information, the prefix storage unit 170 also stores a delete flag notified from the prefix management unit 160. The delete flag indicates prefix information to be deleted. For example, a delete flag of "1" indicates prefix information to be deleted. A delete flag of "0" indicates available prefix information. In response to a request from the IPv6 host unit 150, the prefix storage unit 170 supplies a stored pair of prefix information and a delete flag to the IPv6 host unit 150.

Figure 13:
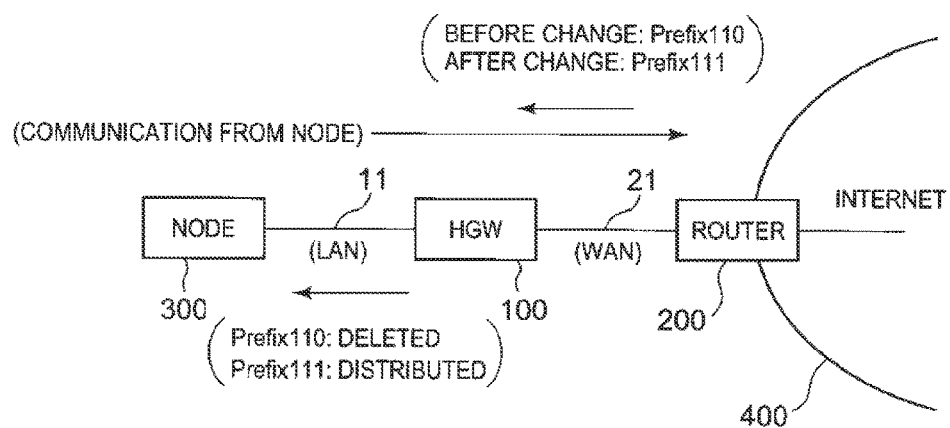
FIG. 13 It depicts a block diagram showing an example of a communication system including a home gateway as a router device.

The process for prefix management unit 160 to decide on prefix information to be notified to the LAN 11 side is as follows:

First, the HGW 101 multicasts a Solicit message to the router 200 (see FIG. 13). Upon receipt of the Solicit message, the router 200 sends an Advertise message to the HGW 101. Upon receipt of the Advertise message, the HGW 101 sends a Request message to the router 200. Upon receipt of the Request message, the router 200 sends a Reply message to the HGW 101.

In the HGW 101, the DHCPv6 client unit 140 acquires "Prefix," "Preferred Lifetime," and "Valid Lifetime" from information set in "Identity Association for Prefix Delegation" as an option of the DHCP Reply message. The DHCPv6 client unit 140 supplies these pieces of information to the prefix management unit 160. Based on these pieces of information, the prefix management unit 160 decides on prefix information to be notified to the LAN 11 side.

When the contents of the option in the DHCP Reply message are modified, i.e., when the prefix information is modified, the prefix management unit 160 also decides on prefix information to be notified to the LAN 11 side, and outputs the decided prefix information into the prefix storage unit 170. Further, when the source address of a discarded packet is output from the filter unit 130, the prefix management unit 160 outputs information indicative of a prefix included in the source address into the prefix storage unit 170. In this exemplary embodiment, it is assumed that the prefix length is 64 bits.

The prefix management unit 160 includes a prefix control unit 161. The prefix control unit 161 decides on a value of the delete flag (0 or 1) corresponding to the prefix information decided by the prefix management unit 160. When outputting the prefix information into the prefix storage unit 170, the prefix management unit 160 also outputs the delete flag corresponding to the prefix information.

Further, the prefix control unit 161 creates a filtering rule based on the prefix information decided by the prefix management unit 160. The prefix management unit 160 outputs, to the filter unit 130, the filtering rule created by the prefix control unit 161.

The filter unit 130 memorizes the filtering rule. Then, when the LAN interface unit 110 receives a packet, the filter unit 130 performs a process according to the filtering rule. Specifically, the filter unit 130 outputs, to the IPv6 unit 112, a packet that does not suit the filtering rule. The filter unit 130 discards a packet that suits the filtering rule. In this case, the filter unit 130 outputs the source address of the discarded packet to the prefix management unit 160. The filter unit 130 does not perform, on a packet from the WAN 21 side, the process according to the filtering rule.

The IPv6 host unit 150 includes an ICMPv6 unit 151 for realizing ICMP (Internet Control Message Protocol) v6 as part of IPv6. The ICMPv6 unit 151 generates ICMPv6 packets, exchanges the ICMPv6 packets, and performs a process relating to the ICMPv6 packets. Note that a portion for realizing IPv6 other than ICMP is omitted in FIG. 1.

Specifically, the ICMPv6 unit 151 inputs an ICMPv6 packet from the IPv6 routing unit 120, performs a process according to an option specified in the ICMPv6 packet, and sends the ICMPv6 packet back to the IPv6 routing unit 120. Further, the ICMPv6 unit 151 periodically acquires prefix information stored in the prefix storage unit 170. The ICMPv6 unit 151 creates option information (option) from the prefix information. The ICMPv6 unit 151 adds the created option to RA for the ICMPv6 packet. The ICMPv6 unit 151 outputs, to the IPv6 routing unit 120, the ICMPv6 packet with an option added thereto. When adding an option, indicative of deletion of a prefix that should not be forwarded, to the RA for the ICMPv6 packet, the ICMPv6 unit 151 notifies the prefix storage unit 170 of the deletion of the prefix.

Figure 4:
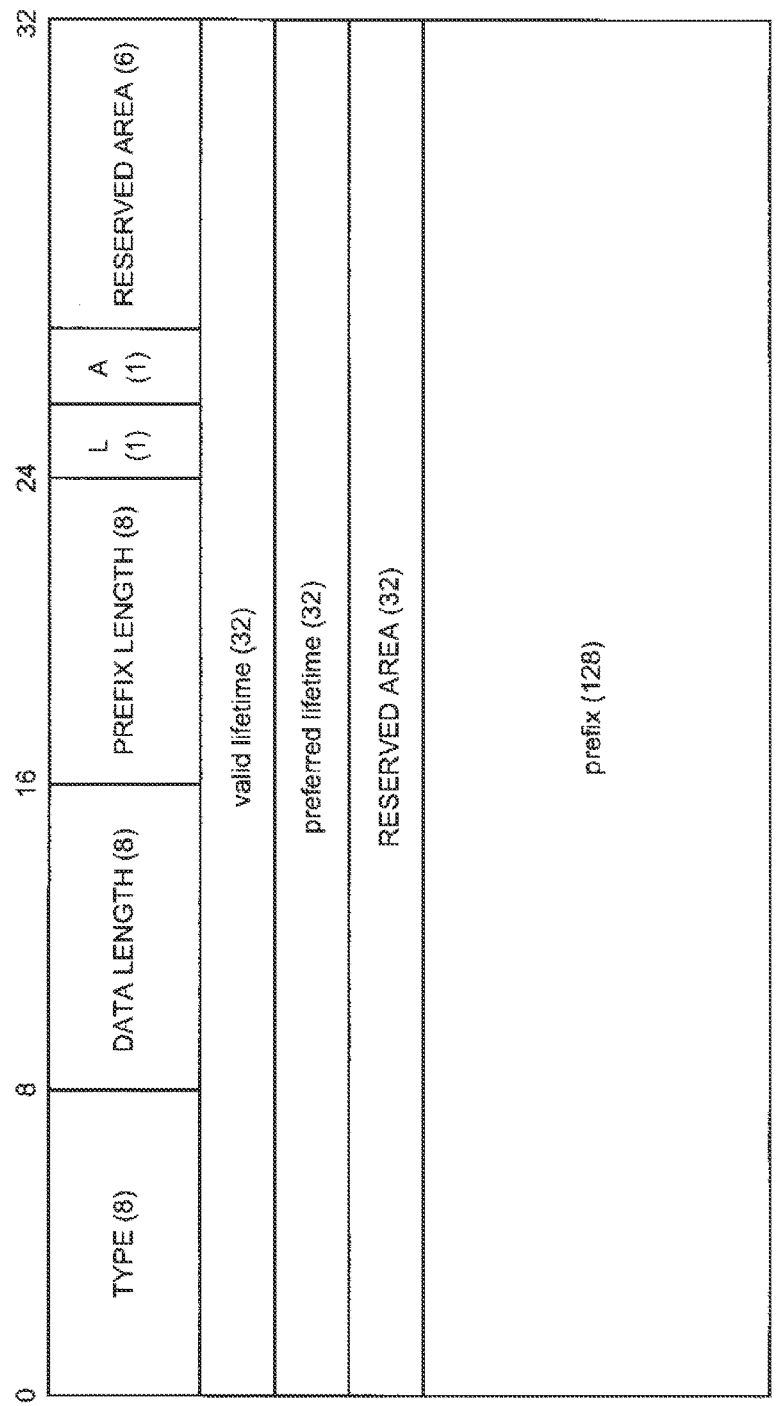
FIG. 4 It depicts an explanatory diagram showing the format of an RA option.

Next, the operation of the first exemplary embodiment of the router device will be described with reference to explanatory diagrams of FIG. 2 to FIG. 4. FIG. 2 is an explanatory diagram showing an example of the relationships between events that have occurred and information stored in the prefix storage unit. FIG. 3 is an explanatory diagram showing an example of a filtering rule. FIG. 4 is an explanatory diagram showing the format of an RA option.

First, an operation when a prefix is distributed to a node connected to the LAN 11 will be described. Note that the node, not shown in FIG. 1, is a device corresponding to the node 300 shown in FIG. 13.

The router 200 (see FIG. 13) on the WAN 21 side sends the HGW 101 prefix information, a next hop address, and a DNS address. The HGW 101 sends the received prefix information to the node connected to the LAN 11.

The router 200 uses DHCPv6 to distribute prefix information to the HGW 101. The HGW 101 uses DHCPv6 to send prefix information to a node.

In the HGW 101, the DHCPv6 client unit 140 outputs, to the prefix management unit 160, prefix information notified by DHCPv6-PD. It is assumed that the prefix specified in the information notified by DHCPv6-PD is "Prefix 110."

The prefix management unit 160 outputs, into the prefix storage unit 170, "Prefix 110" and a delete flag set to "0" based on the received prefix information. As shown in a line saying "Prefix 110 is Notified from Router on WAN Side" in FIG. 2, the prefix storage unit 170 stores "Prefix 110" and the delete flag the value of which is "0."

Further, when prefix information is input, the prefix control unit 161 creates a filtering rule (see FIG. 3). The prefix management unit 160 outputs the created filtering rule to the filter unit 130. The filter unit 130 memorizes the filtering rule. If two or more pieces of prefix information are received, the prefix control unit 161 creates a filtering rule and a delete flag corresponding to each of the prefix information, respectively. The prefix management unit 160 outputs two or more sets of filtering rules and delete flags to the filter unit 130.

The ICMPv6 unit 151 periodically acquires prefix information stored in the prefix storage unit 170. In the example shown in FIG. 2, only "Prefix 110" is stored in the prefix storage unit 170 as prefix information (see the line saying "Prefix 110 is Notified from Router on WAN Side"). The ICMPv6 unit 151 adds "Prefix 110" to an option of a RA packet. The ICMPv6 unit 151 outputs, to the IPv6 routing unit 120, the RA packet with the option added thereto. The IPv6 routing unit 120 outputs the RA packet to the IPv6 unit 111. The RA packet is sent to the node through the LAN interface unit 110 and the LAN 11.

After that, the node uses "Prefix 110" added to the option of the received RA packet to perform a process for automatically generating a stateless address in order to generate an IP address. The node uses the generated IP address to communicate with the node 200 (see FIG. 13) and other devices through the Internet 400.

When the filtering rule illustrated in FIG. 3 is used, if the prefix of the source address (SrcIP address) of each IPv6 packet headed from the LAN 11 side toward the WAN 21 side is not the prefix ("Prefix 110" in this example) distributed to the node, the IPv6 packet is discarded. In the example shown in FIG. 3, information indicating that the source address is notified to the prefix management unit 160 when the packet is discarded is added to the filtering rule. Also indicated in the filtering rule is that the destination address (DstIP address) is unquestioned.

Next, the operation of the router device when a prefix is changed will be described. Suppose that the router 200 changes the prefix from "Prefix 110" to "Prefix 111." In this case, the router 200 notifies the HGW 101 of "Prefix 111" as a new prefix by DHCPv6-PD.

In the HGW 101, the DHCPv6 client unit 140 outputs, to the prefix management unit 160, prefix information notified by DHCPv6-PD. The prefix specified in the information notified by DHCPv6-PD is "Prefix 111."

In the prefix management unit 160, the prefix control unit 161 outputs, into the prefix storage unit 170, an instruction for setting, to "1," the value of the delete flag corresponding to "Prefix 110" as the prefix before being changed to "Prefix 111." The prefix control unit 161 also outputs, into the prefix storage unit 170, "Prefix 111" and a delete flag set to "0" based on the received prefix information. As shown in a line saying "Router on WAN Side Has Changed Prefix" in FIG. 2, the prefix storage unit 170 sets the value of the delete flag corresponding to "Prefix 110" to "1," and stores "Prefix 111" and a delete flag the value of which is "0."

When prefix information as "Prefix 111" is received, the prefix control unit 161 creates a filtering rule. The prefix management unit 160 issues a command to the filter unit 130 to delete the filtering rule. In this example, the target of the delete command is the filtering rule relating to "Prefix 110." The prefix management unit 160 outputs, to the filter unit 130, a new filtering rule created. The filter unit 130 memorizes the new filtering rule. The filtering rule memorized by the filter unit 130 is represented as the filtering rule illustrated in FIG. 3, but at this stage, "IP address Including Prefix that is not Distributed from HGW 101 to Node" is an IP address including a prefix other than "Prefix 111."

The ICMPv6 unit 151 periodically acquires prefix information stored in the prefix storage unit 170. When the line saying "Prefix 110 is Notified from Router on WAN Side" is valid (see FIG. 2), "Prefix 110" and "Prefix 111" are stored in the prefix storage unit 170 as prefix information. In this case, the value of the delete flag corresponding to "Prefix 111" is "0" and the value of the delete flag corresponding to "Prefix 111" is "1." Therefore, the ICMPv6 unit 151 adds, to the option of an RA packet, data indicative of deletion of "Prefix 110" and data indicative of distribution of "Prefix 111." The ICMPv6 unit 151 outputs, to the IPv6 routing unit 120, the RA packet with the option added thereto. The IPv6 routing unit 120 outputs the RA packet to the IPv6 unit 111. The RA packet is sent to the node through the LAN interface unit 110 and the LAN 11.

The ICMPv6 unit 151 also notifies the prefix storage unit 170 that the RA packet with the data indicative of deletion of "Prefix 110" and the data indicative of distribution of "Prefix 111" added thereto has been sent.

Upon receipt of the notification, the prefix storage unit 170 deletes information on "Prefix 110." As a result, as shown in a line saying "After RA Transmission" in FIG. 2, only "Prefix 111" is stored as prefix information.

If the arrival of packets is not guaranteed such as when the LAN 11 is the Ethernet (registered trademark), the node may not be able to receive such a packet to include the option indicative of deletion of "Prefix 110." When the node cannot receive the packet including the option indicative of deletion of "Prefix 110," "Prefix 110" remains held as the prefix. Therefore, the node uses "Prefix 110" the use of which should be prohibited to communicate with the HGW 101, the router 200, and the Internet 400.

When the HGW 101 is rebooted, the node may also perform communication using the prefix the use of which should be prohibited. At the time when the HGW 101 is rebooted after the HGW 101 distributes "Prefix 110" to the node and "Prefix 111" is sent as the prefix from the router 200 after reboot, the router 200 and the HGW 101 recognize that the prefix is "Prefix 111." However, "Prefix 110" is held at the node. In such a situation, the node sends, as the prefix, "Prefix 110" that should not be sent.

Next, the operation of the HGW 101 when the node sends a prefix that should not be sent will be described by taking, as an example, a case where the node recognizes that the prefix is "Prefix 110" and the HGW 101 recognizes that the prefix is "Prefix 111." In other words, the prefix storage unit 170 holds "Prefix 111" and a corresponding delete flag of "0."

The HGW 101 receives a packet sent from the node through the LAN 11. In the HGW 101, the packet is passed through the LAN interface unit 110, the IPv6 unit 111, and the IPv6 routing unit 120. Then, the filter unit 130 inputs the packet. The prefix of a source address set in the packet is "Prefix 110." The filter unit 130 remembers a filtering rule indicating that "Prefix 111" is a prefix distributed by the HGW 101. Since the prefix of the source address is different from "Prefix 111," this filtering rule is suited.

Therefore, the filter unit 130 discards the input packet. The filter unit 130 also notifies the prefix management unit 160 of the source address set in the packet.

The prefix management unit 160 can acquire the prefix from the source address. In this exemplary embodiment, since the prefix length is 64 bits, the prefix management unit 160 extracts data on the first 64 bits of the source address, and recognizes the extracted data as a prefix.

In this example, the source address set in the packet is "Prefix 110." Since "Prefix 110" is a prefix that should not be used, the prefix control unit 161 creates a delete flag the value of which is "1." The prefix management unit 160 outputs, into the prefix storage unit 170, "Prefix 110" and the delete flag created by the prefix control unit 161. The prefix storage unit 170 stores "Prefix 110" and the delete flag the value of which is "1."

According to the above-mentioned procedure, the value of the delete flag corresponding to "Prefix 110" is set to "1" as shown in the line saying "Router on WAN Side Has Changed Prefix" in FIG. 2, and "Prefix 111" and the delete flag the value of which is "0" are stored as prefix information.

The ICMPv6 unit 151 periodically acquires prefix information stored in the prefix storage unit 170. The ICMPv6 unit 151 creates an option from the prefix information. The ICMPv6 unit 151 adds the created option to RA for the ICMPv6 packet.

FIG. 4 is an explanatory diagram showing the format of an RA option. In the option, the ICMPv6 unit 151 sets "3" in "Type," "4" in "Data Length," and "64 bits" in "Prefix Length." Note that "L" indicates the same link flag, and "A" indicates an address setting flag.

The ICMPv6 unit 151 also sets "0" in "Valid Lifetime" and "0" in "Preferred Lifetime." Further, the ICMPv6 unit 151 sets a prefix to be deleted ("Prefix 110" in this example) in "Prefix."

In general, the router device periodically sends nodes an RA packet with valid terms set for the "Valid Lifetime" and "Preferred Lifetime" of the distributed prefix to update the valid lifetime of the prefix.

In this exemplary embodiment, since the delete flag is also stored in the prefix storage unit 170, the ICMPv6 unit 151 can easily determine whether the prefix stored in the prefix storage unit 170 is usable.

As mentioned above, the ICMPv6 unit 151 periodically acquires prefix information stored in the prefix storage unit 170. Based on the acquired prefix information, the ICMPv6 unit 151 creates and sends an RA packet to the node. Through a checking operation using an RA packet periodically sent, the HGW 101 distributes or updates (specifically, deletes) a prefix. Specifically, in this exemplary embodiment, the ICMPv6 unit 151 creates an option to delete "Prefix 110" to be deleted, and an option to distribute "Prefix 111." Then, the IPv6 host unit 150 outputs, to the IPv6 routing unit 120, an RA packet with the option created by the ICMPv6 unit 151 added thereto.

The RA packet is routed by the IPv6 routing unit 120, and sent to the node through the IPv6 unit 111, the LAN interface unit 110, and the LAN 11. Based on the RA packet received, the node recognizes that "Prefix 110" is not usable and "Prefix 111" should be used.

After that, the node uses "Prefix 111" added to the option of the received RA packet to perform a process for automatically generating a stateless address in order to generate an IP address. The node uses the generated IP address to perform communication through the node 200 (see FIG. 13) and the Internet 400.

Through the above-mentioned procedure, the node can invalidate "Prefix 110" held. In other words, the node receiving an RA packet including option information capable of identifying a prefix to be deleted (unusable prefix) deletes the prefix identified.

As described above, in this exemplary embodiment, the HGW 101 can use the option of the RA packet to invalidate the prefix that should not be sent to the node. Specifically, the HGW 101 sends an RA packet for "Prefix 110" not to be sent, in which "Valid Lifetime" and "Preferred Lifetime" in the option are set to "0."

Further, since the HGW 101 discards packets from nodes including any prefix that is not notified from the router 200 (see FIG. 13), such a situation in which packets including a common source address are sent from multiple nodes to the router 200 can be avoided.

In general, after a new prefix (e.g., "Prefix 111") is distributed to the HGW 101 based on the DHCP-PD function, the router 200 can distribute the old prefix (e.g. "Prefix 110") to any other router device. If the old prefix is used by a node connected to the HGW 101 through the LAN 11 after the old prefix is distributed to any other router device, packets including a common source address will be sent from multiple nodes to the router 200.

However, in the case of the use of the HGW 101 in this exemplary embodiment, such a situation that the packets including the common source address are sent to the router 200 from the multiple nodes to the router 200 can be avoided.

In this exemplary embodiment, the HGW 101 compares a source IP address included in each packet received from each node with a prefix sent from the upper router 200 to determine whether the packet received from the node is a packet to be forwarded. When determining that the packet received from the node should not be forwarded, the HGW 101 discards the packet. This prevents any packet including a source IP address based on an unusable prefix from being sent to the Internet.

Further, the HGW 101 sends the node an RA packet including an instruction for deletion of an unusable prefix and option information indicative of the new prefix notified from the node 200. The node receiving such an RA packet can delete the unusable prefix and use the new prefix to make a quick transition to a state of being communicable with the router 200 and other devices through the Internet.

Exemplary Embodiment 2

Figure 5:
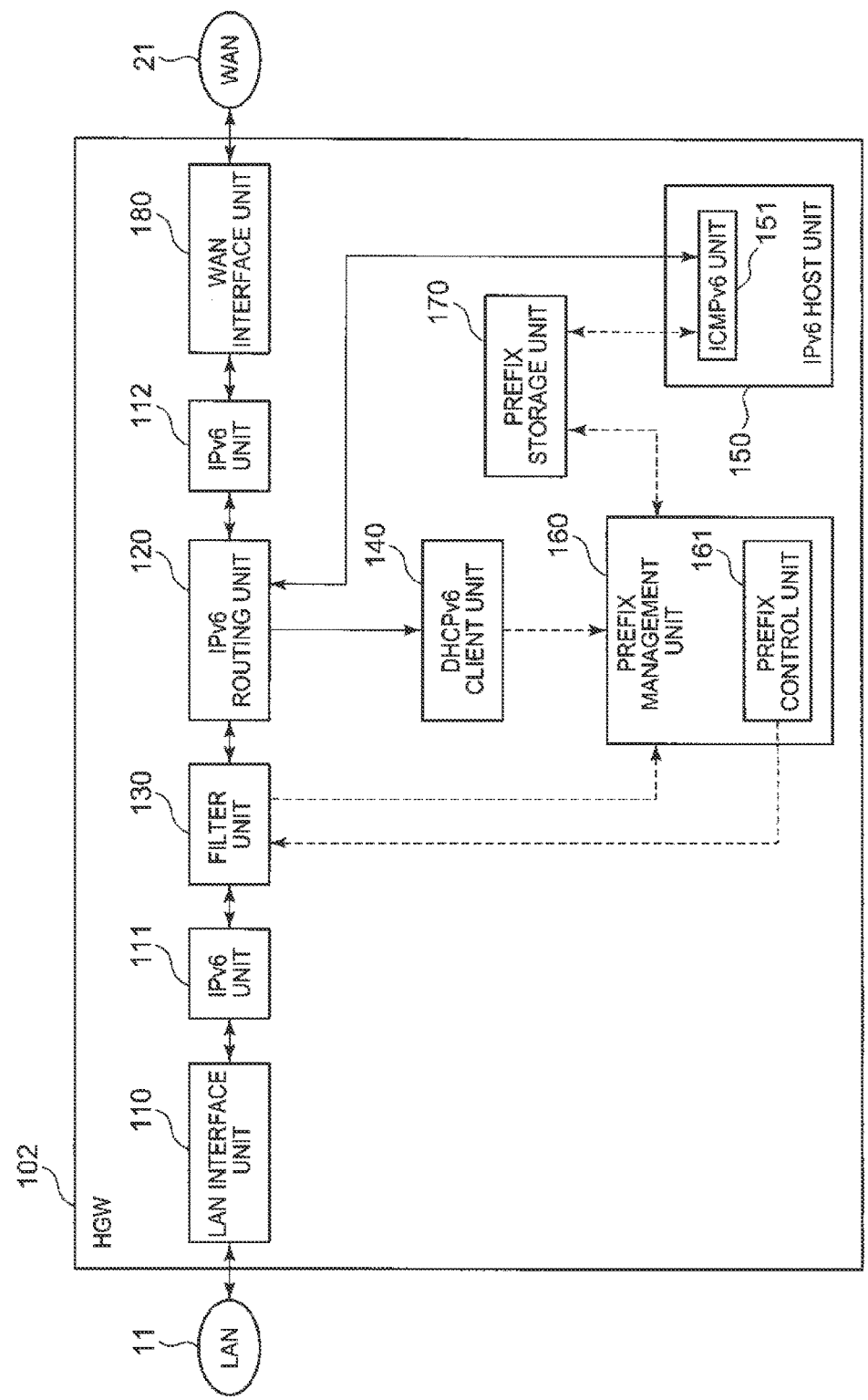
FIG. 5 It depicts a block diagram showing a second exemplary embodiment of the router device according to the present invention.

FIG. 5 is a block diagram showing a second exemplary embodiment of the router device according to the present invention. FIG. 5 shows HGW 102 as an example of the router device. The configuration of a communication system including the HGW 102 may be the same as that in the example shown in FIG. 13.

In the HGW 101 according to the first exemplary embodiment shown in FIG. 1, the filter unit 130 is arranged between the IPv6 routing unit 120 and the IPv6 unit 112. On the other hand, in this exemplary embodiment, the filter unit 130 is arranged between the IPv6 unit 111 and the IPv6 routing unit 120 as shown in FIG. 5.

Processing performed by each block in the HGW 102 is the same as that performed by each block in the HGW 101.

FIG. 6 is an explanatory diagram showing an example of a filtering rule. In this exemplary embodiment, it is assumed that, after the node 200 (see FIG. 13) distributes "Prefix 110" to the HGW 102 based on the DHCP-PD function, the node 200 changes the prefix to "Prefix 111." Therefore, the ICMPv6 unit 151 notifies the prefix storage unit 170 that an RA packet, to which data indicative of deletion of "Prefix 110" and data indicative of distribution of "Prefix 111" are added, has been sent. As shown in the line saying "After RA Transmission" in FIG. 2, the prefix storage unit 170 stores prefix information in which "Prefix 110" is deleted and only "Prefix 111" is set.

As an example, the following will take a case where the HGW 102 recognizes that the prefix is "Prefix 111" but the node recognizes that the prefix is "Prefix 110" because it was not be able to receive a packet including an option indicative of deletion of "Prefix 110."

Further, in the first exemplary embodiment, a prefix headed from the IPv6 routing unit 120 toward the IPv6 unit 112 is controlled as shown in FIG. 3, while in this exemplary embodiment, a prefix headed from the IPv6 unit 111 toward the IPv6 routing unit 120 is controlled as shown in FIG. 6.

Next, the operation of the HGW 102 will be described.

In the HGW 102, a packet sent from a node through the LAN 11 is input into the filter unit 130 via the LAN interface unit 110 and the IPv6 unit 111. In the first exemplary embodiment, the packet is input from the IPv6 unit 111 to the IPv6 routing unit 120. On the other hand, in this exemplary embodiment, since the filter unit 130 is located upstream of (on the LAN side of) the IPv6 routing unit 120, the filtering process is performed before the routing process.

In this example, the prefix in the IP address from the node is "Prefix 110." As a result, the filtering rule is suited. Therefore, the filter unit 130 discards the packet. Further, the filter unit 130 notifies the prefix management unit 160 of a source address set in the packet.

The prefix management unit 160 analyzes the source address. The prefix management unit 160 recognizes "Prefix 110" from the source address. Since "Prefix 110" is a prefix that should not be used, the prefix control unit 161 creates a delete flag the value of which is "1" in the same manner as in the first exemplary embodiment. The prefix management unit 160 outputs, into the prefix storage unit 170, "Prefix 110" and the delete flag created by the prefix control unit 161. The prefix storage unit 170 stores "Prefix 110" and the delete flag the value of which is "1."

The ICMPv6 unit 151 periodically acquires prefix information stored in the prefix storage unit 170. The ICMPv6 unit 151 creates option information (option) from the prefix information. The ICMPv6 unit 151 adds the created option to RA the ICMPv6 packet.

The RA packet is routed by the IPv6 routing unit 120, and sent to the node through the filter unit 130, the IPv6 unit 111, the LAN interface unit 110, and the LAN 11. Based on the received RA packet, the node recognizes that "Prefix 110" is unusable and "Prefix 111" should be used.

In the first exemplary embodiment, since the filter unit 130 is located downstream of (on the WAN side of) the IPv6 routing unit 120, packets input from the node are routed once. Then, the filter unit 130 performs filtering on only packets headed toward the WAN side. On the other hand, in this exemplary embodiment, since the filter unit 130 is located upstream of the IPv6 routing unit 120, the filtering process is performed before the routing process. Thus, the filter unit 130 can perform filtering on even packets routed within the LAN. In addition to the effects of the first exemplary embodiment, this exemplary embodiment can achieve not only such an effect that forwarding of packets can be prohibited based on the packets routed within the LAN, but also such an effect that an RA packet for updating the prefix can be sent.

Exemplary Embodiment 3

Figure 7:
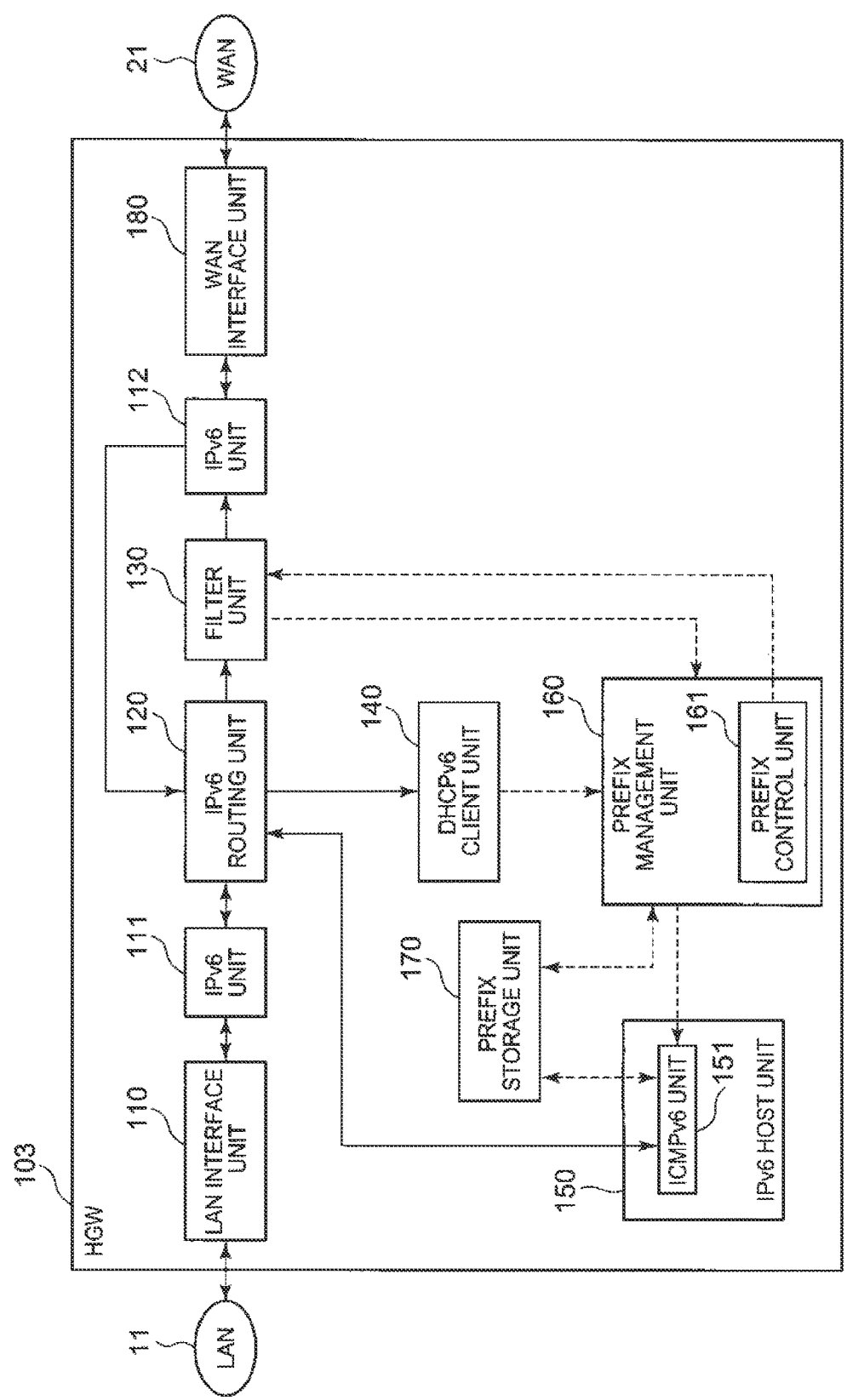
FIG. 7 It depicts a block diagram showing a third exemplary embodiment of the router device according to the present invention.

FIG. 7 is a block diagram showing a third exemplary embodiment of the router device according to the present invention. FIG. 7 shows HGW 103 as an example of the router device. The configuration of a communication system including the HGW 103 may be the same as that in the example shown in FIG. 13.

Processing performed by each block in the HGW 103 is the same as that performed by each block in the HGW 101, 102.

In the first exemplary embodiment and the second exemplary embodiment, the HGW 101, 102 is such that the ICMPv6 unit 151 in the IPv6 host unit 150 periodically acquires prefix information stored in the prefix storage unit 170. Then, based on the acquired prefix information, the ICMPv6 unit 151 creates and sends an RA packet to the node. In other words, the HGW 101, 102 makes confirmations using the RA packet sent periodically to distribute a prefix and update (specifically, delete) the prefix.

In this exemplary embodiment, upon receipt of a prefix deletion notification from the node 200 (see FIG. 13), the IPv6 host unit 150 immediately performs processing for causing the node to delete the prefix.

The following will describe the operation of the HGW 103.

In this exemplary embodiment, it is assumed that, after the node 200 (see FIG. 13) distributes "Prefix 110" to the HGW 103 based on the DHCP-PD function, the node 200 changes the prefix to "Prefix 111." Therefore, the ICMPv6 unit 151 notifies the prefix storage unit 170 that an RA packet, to which data indicative of deletion of "Prefix 110" and data indicative of distribution of "Prefix 111" are added, has been sent. As shown in the line saying "After RA Transmission" in FIG. 2, the prefix storage unit 170 stores prefix information in which "Prefix 110" is deleted and only "Prefix 111" is set.

As an example, the following will take a case where the HGW 103 recognizes that the prefix is "Prefix 111" but the node recognizes that the prefix is "Prefix 110" because it was not be able to receive a packet including an option indicative of deletion of "Prefix 110."

The prefix in the IP address from the node is "Prefix 110." As a result, the filtering rule is suited. Therefore, the filter unit 130 discards the packet. Further, the filter unit 130 notifies the prefix management unit 160 of a source address set in the packet.

The prefix management unit 160 analyzes the source address. The prefix management unit 160 recognizes "Prefix 110" from the source address. When "Prefix 110" is recognized from the source address, the prefix control unit 161 creates a filtering rule. The prefix management unit 160 outputs the created filtering rule to the filter unit 130. The filter unit 130 memorizes the filtering rule.

FIG. 8 is an explanatory diagram showing an example of a filtering rule in this exemplary embodiment. In this exemplary embodiment, as shown in FIG. 8, the prefix management unit 160 creates a filtering rule with a rule for the prefix ("Prefix 110" in this example) included in the packet discarded by the filter unit 130 added thereto (see the second line in FIG. 8).

After that, the filter unit 130 performs filtering according to the filtering rule. When a packet that meets the rule set in the second line of FIG. 8 is received, the filter unit 130 discards the packet. The filter unit 130 notifies the prefix management unit 160 that the packet has been discarded.

In the prefix management unit 160, the prefix control unit 161 creates a delete flag the value of which is "1." The prefix management unit 160 outputs, into the prefix storage unit 170, "Prefix 110" and the delete flag created by the prefix control unit 161. The prefix storage unit 170 stores "Prefix 110" and the delete flag the value of which is "1." In other words, as shown in the line saying "Router on WAN Side Has Changed Prefix" in FIG. 2, the prefix storage unit 170 sets the value of the delete flag corresponding to "Prefix 110" to "1," and stores "Prefix 111" and the delete flag the value of which is "0."

Further, when notified that the packet has been discarded, the prefix management unit 160 outputs a delete command to the ICMPv6 unit 151.

When the delete command is input, the ICMPv6 unit 151 immediately acquires prefix information stored in the prefix storage unit 170. The ICMPv6 unit 151 creates option information (option) from the prefix information. Specifically, the ICMPv6 unit 151 sets, in the option of RA, the prefix ("Prefix 110" in this example) corresponding to the delete flag the value of which is "1" in the prefix information. The ICMPv6 unit 151 adds the created option to RA for the ICMPv6 packet.

The RA packet is routed by the IPv6 routing unit 120, and sent to the node through the IPv6 unit 111, the LAN interface unit 110, and the LAN 11. Based on the received RA packet, the node recognizes that "Prefix 110" is unusable.

In this exemplary embodiment, when the prefix management unit 160 outputs the delete command, the ICMPv6 unit 151 immediately checks on prefix information stored in the prefix storage unit 170. Thus, an unusable prefix is transmitted faster than the case where the ICMPv6 unit 151 periodically checks on prefix information stored in the prefix storage unit 170. In addition to the effects of the first exemplary embodiment, this exemplary embodiment can achieve such an effect that the node can set itself promptly not to use an unusable prefix.

Note that the HGW 103 shown in FIG. 7 is based on the HGW 101 shown in FIG. 1, but the HGW 103 may also be based on the HGW 102 in which the filter unit 130 is arranged between the IPv6 unit 111 and IPv6 routing unit 120 as shown in FIG. 5.

Further, in the HGW 101, 102, 103, the functions of blocks other than the LAN interface unit 110 and the WAN interface unit 180 can be implemented by a CPU and a memory to perform control according to a program.

In each of the aforementioned exemplary embodiments, HGW is taken as an example of the router device, but the router device to which the present invention is applicable is not limited to HGW.

Figure 9:
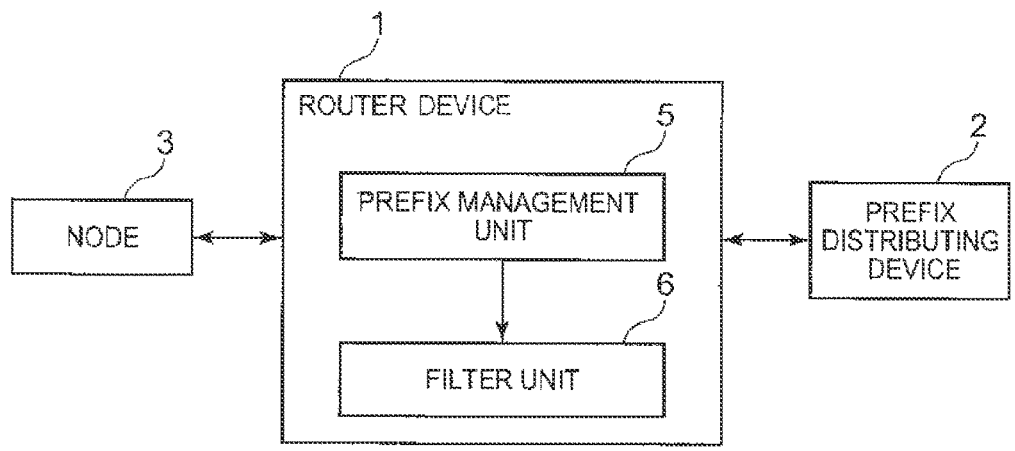
FIG. 9 It depicts a block diagram showing a major part of a router device according to the present invention.

FIG. 9 is a block diagram showing a major part of a router device according to the present invention. As shown in FIG. 9, a router device 1 includes a prefix management unit 5 (as an example, the prefix management unit 160 shown in FIG. 1, FIG. 5, and FIG. 7, respectively) for creating a filtering rule including an indication of the passage or block of a packet from a node 3 based on a prefix distributed from a prefix distributing device 2 (as an example, the router 200 shown in FIG. 13) and a prefix in a source IP address received from the node 3 (as an example, the node 300 shown in FIG. 13), and a filter unit 6 (as an example, the filter unit 130 shown in FIG. 1, FIG. 5, and FIG. 7, respectively) for passing or blocking the packet from the node according to the filtering rule created by the prefix management unit 5.

In each of the aforementioned exemplary embodiments, the following router devices are also disclosed:

(1) The router device in which, when a received packet meets the indication of blocking the packet in the filtering rule, the filter unit 6 discards the packet and notifies the prefix management unit 5 of the source IP address of the discarded packet, and the prefix management unit 5 determines that a prefix included in the notified source IP address is a prefix unusable and to be deleted.

Figure 10:
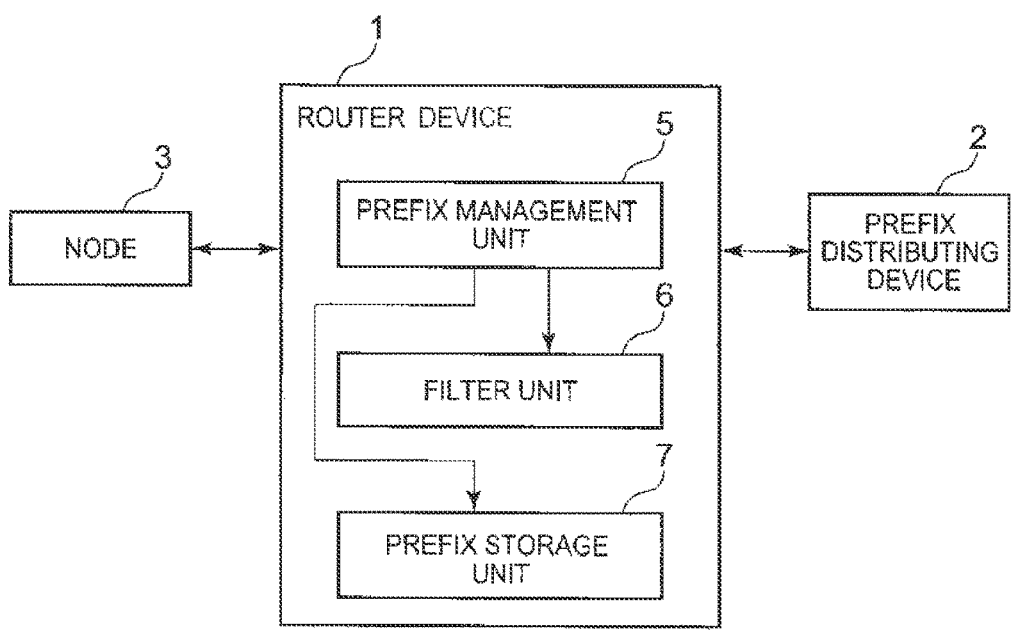
FIG. 10 It depicts a block diagram showing a major part of another aspect of the router device according to the present invention.

(2) The router device as shown in FIG. 10, which further includes a prefix storage unit 7 (as an example, the prefix storage unit 170 shown in FIG. 1, FIG. 5, and FIG. 7, respectively) for storing a prefix together with discriminative data (as an example, delete indicative data) used to determine whether the prefix is usable.

Figure 11:
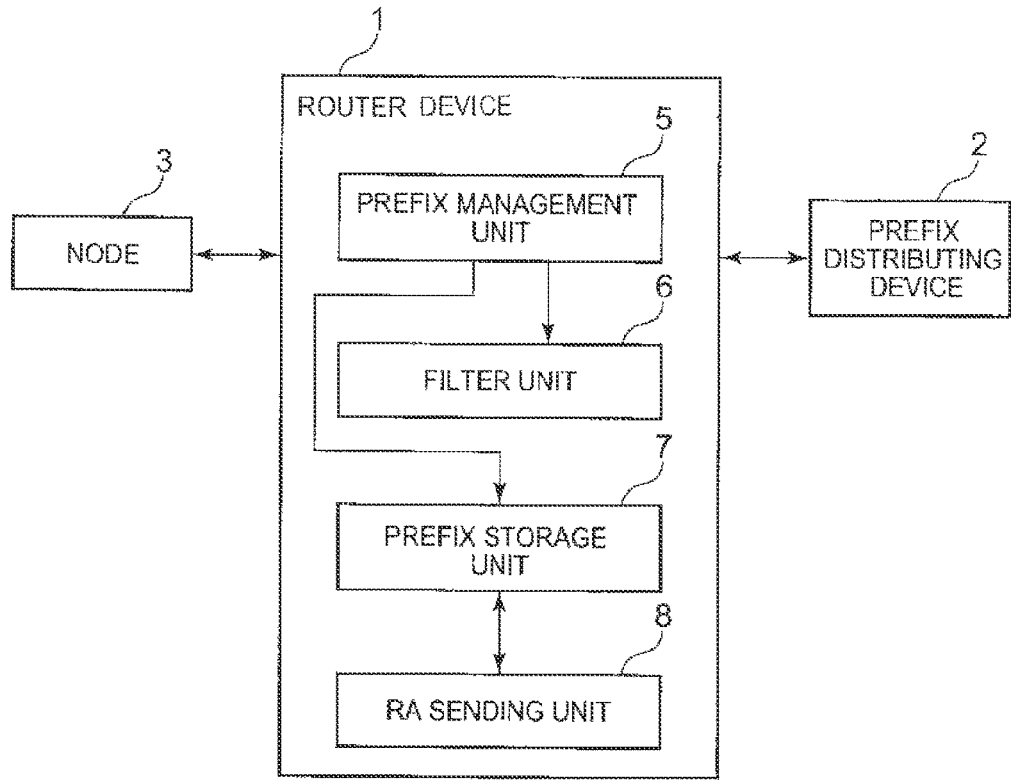
FIG. 11 It depicts a block diagram showing a major part of still another aspect of the router device according to the present invention.

(3) The router device as shown in FIG. 11, which further includes an RA sending unit 8 for periodically checking on the contents stored in the prefix storage unit 7, creating option information on an RA packet capable of identifying whether a prefix is usable or unusable based on the prefix and the discriminative data stored in the prefix storage unit 7, and sending a node an RA packet including the created option information.

(4) The router device in which when the filter unit 6 discards the packet, the RA sending unit 8 immediately sends the node 3 an RA packet including option information capable of identifying that the prefix included in the source IP address of the packet is unusable.

(5) The router device in which when a prefix is distributed from the prefix distributing device 2, the prefix management unit 5 sets discriminative data corresponding to the prefix to a value indicating that the prefix is usable, and when a new prefix is distributed from the prefix distributing device 2, the prefix management unit 5 changes the discriminative data corresponding to the already distributed prefix to a value indicating that the prefix is unusable.

Figure 12:
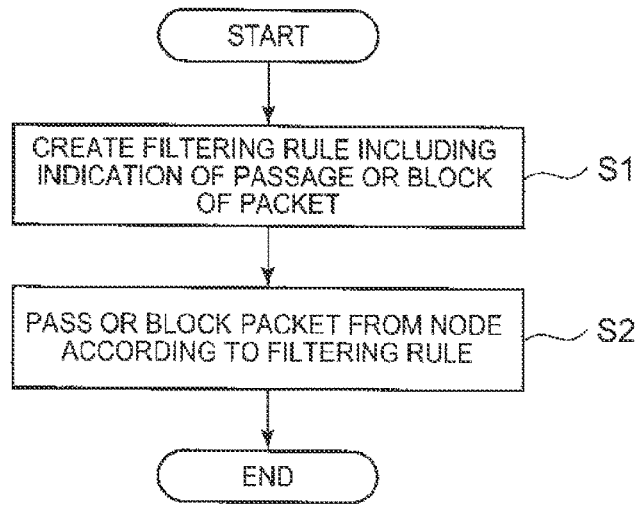
FIG. 12 It depicts a flowchart showing the operation of a router device according to the present invention.

FIG. 12 is a flowchart showing the operation of a router device according to the present invention, i.e., a flowchart showing processing in a packet control method according to the present invention. As shown in FIG. 12, the router device is characterized by including a process (step S1) for creating a filtering rule including an indication of the passage or block of a packet from a node based on a prefix distributed from a prefix distributing device and a prefix in a source IP address received from a node, and a process (step S2) for passing or blocking a packet from the node according to the created filtering rule.

In each of the aforementioned exemplary embodiments, the following packet control methods are also disclosed:

(6) The packet control method in which the process to pass or block a packet includes a process to discard a packet when the received packet meets the indication of blocking the packet in the filtering rule and determine that a prefix included in the source IP address of the discarded packet is unusable and to be deleted.

(7) The packet control method further including a process to store, in a prefix storage unit, a prefix together with discriminative data used to determine whether the prefix is usable.

(8) The packet control method further including a process to periodically check on the contents stored in the prefix storage unit, create option information on an RA packet capable of identifying whether a prefix is usable or unusable based on the prefix and the discriminative data stored in the prefix storage unit, and send a node an RA packet including the created option information.

(9) The packet control method further including a process in which when a packet received from the node is discarded, an RA packet including option information capable of identifying that the prefix included in the source IP address of the packet is unusable is immediately sent to the node.

(10) The packet control method further including a process in which when a prefix is distributed from the prefix distributing device, discriminative data corresponding to the prefix is set to a value indicating that the prefix is usable, and when a new prefix is distributed from the prefix distributing device, the discriminative data corresponding to the already distributed prefix is changed to a value indicating that the prefix is unusable.

As described above, although the present invention is described with reference to the exemplary embodiments and examples, the present invention is not limited to the aforementioned exemplary embodiments and examples. Various changes that can be understood by those skilled in the art within the scope of the present invention can be made to the configurations and details of the present invention.

This application claims priority based on Japanese Patent Application No. 2011-38873, filed on Feb. 24, 2011, the entire disclosure of which is incorporated herein by reference.

INDUSTRIAL APPLICABILITY

The present invention can be suitably employed in a normal IPv6 Internet access service environment in which a prefix is distributed from an upper router to a router device and the router device redistributes the prefix to a lower node device.

REFERENCE SIGNS LIST

1 ROUTER DEVICE
2 PREFIX DISTRIBUTING DEVICE
3 NODE
5 PREFIX MANAGEMENT UNIT
6 FILTER UNIT
7 PREFIX STORAGE DEVICE
8 RA SENDING UNIT
11 LAN
21 WAN
101,102,103 HGW
110 LAN INTERFACE UNIT
111,112 IPv6 UNIT
120 IPv6 ROUTING UNIT
130 FILTER UNIT
140 DHCPv6 CLIENT UNIT
150 IPv6 HOST UNIT
151 ICMPv6 UNIT
160 PREFIX MANAGEMENT UNIT

161 PREFIX CONTROL UNIT
170 PREFIX STORAGE UNIT
180 WAN INTERFACE UNIT

The invention claimed is:

1. A router device for redistributing, to a node, a prefix distributed from a prefix distributing device to route a packet based on an IPv6 address, the router device comprising:
hardware including a processor;
a prefix management unit implemented at least by the hardware and which creates a filtering rule including an indication of passage or block of a packet from the node based on the prefix distributed from the prefix distributing device and a prefix in a source IP address received from the node;
a filter unit implemented at least by the hardware and which passes or blocks the packet from the node according to the filtering rule created by the prefix management unit;
a prefix storage unit which stores the prefix, from the prefix distributing device, together with discriminative data used to determine whether the prefix, in the source IP address, is usable; and
a Router Advertisement (RA) sending unit implemented at least by the hardware which:
periodically checks on contents, comprising a deletion flag indicating whether to delete the prefix, stored in the prefix storage unit;
creates option information on an RA packet capable of identifying whether the prefix, in the source IP address, is usable or unusable based on the prefix, from the prefix distributing device;
adds data to the RA packet and indicative of deletion of the prefix, and the discriminative data stored in the prefix storage unit; and
sends to another node an RA packet including the created option information;
wherein when a received packet meets the indication of blocking the packet in the filtering rule, the filter unit discards the packet and notifies the prefix management unit of the source IP address of the discarded packet,
wherein, based on the data, the prefix management unit determines that the prefix included in the notified source IP address is a prefix unusable and to be deleted,
wherein the indication of blocking the packet in the filtering rule is that the received packet includes, in the source IP address, the prefix which is not distributed to the node by the router device, and
wherein when the packet including the prefix in the source IP address is received from the node, the filter unit discards the packet.

2. The router device according to claim 1, wherein when the filter unit discards the packet, the RA sending unit immediately sends to the another node an RA packet including option information capable of identifying that the prefix included in the source IP address of the packet is unusable.

3. The router device according to claim 1, wherein when a prefix is distributed from the prefix distributing device, the prefix management unit sets discriminative data corresponding to the prefix to a value indicating that the prefix is usable, and when a new prefix is distributed from the prefix distributing device, the prefix management unit changes the discriminative data corresponding to the already distributed prefix to a value indicating that the prefix is unusable.

4. A packet control method based on prefix management performed by a router device for redistributing, to a node, a prefix distributed from a prefix distributing device to route a packet based on an IPv6 address, the packet control method based on prefix management comprising:
creating a filtering rule including an indication of passage or block of a packet from the node based on the prefix distributed from the prefix distributing device and a prefix in a source IP address received from the node;
passing or blocking the packet from the node according to the created filtering rule;
storing the prefix, from the prefix distributing device, together with discriminative data used to determine whether the prefix, in the source IP address, is usable; and
periodically checking on the stored prefix and the discriminative data comprising a deletion flag indicating whether to delete the prefix;
creating option information on an RA packet capable of identifying whether the prefix, in the source IP address, is usable or unusable based on the stored prefix;
adding data to the RA packet and indicative of deletion of the prefix, and the discriminative data; and
sending to another node an RA packet including the created option information;
wherein when a received packet meets the indication of blocking the packet in the filtering rule, the packet is discarded and, based on the data, the prefix included in the source IP address of the discarded packet is determined to be a prefix unusable and to be deleted,
wherein the indication of blocking the packet in the filtering rule is that the received packet includes, in the source IP address, the prefix which is not distributed to the node by the router device, and
wherein when the packet including the prefix in the source IP address is received from the node, the packet is discarded.

5. A non-transitory computer readable information recording medium storing a packet control program based on prefix management, which is installed in a router device for redistributing, to a node, a prefix distributed from a prefix distributing device to route a packet based on an IPv6 address, the packet control program based on prefix management, when executed by a processor, performs a method for:
creating a filtering rule including an indication of passage or block of a packet from the node based on the prefix distributed from the prefix distributing device and a prefix in a source IP address received from the node; and
passing or blocking the packet from the node according to the created filtering rule;
storing the prefix, from the prefix distributing device, together with discriminative data used to determine whether the prefix, in the source IP address, is usable; and
periodically checking on the stored prefix and the discriminative data comprising a deletion flag indicating whether to delete the prefix;
creating option information on an RA packet capable of identifying whether the prefix, in the source IP address, is usable or unusable based on the stored prefix;
adding data to the RA packet and indicative of deletion of the prefix, and the discriminative data; and
sending to another node an RA packet including the created option information;
wherein when a received packet meets the indication of blocking the packet in the filtering rule, the packet is discarded and, based on the data, the prefix included in the source IP address of the discarded packet is determined to be a prefix unusable and to be deleted, wherein the indication of blocking the packet in the filtering rule is that the received packet includes, in the source IP address, the prefix which is not distributed to the node by the router device in the source IP address, and wherein when the packet including the prefix in the source IP address is received from the node, the packet is discarded.

6. The router device according to claim 1, wherein the prefix distributing device is accessible to the Internet, the router device is communicable with the prefix distributing device through a Wide Area Network, and the router is communicable with the node through a LAN to relay communication between the node and the prefix distributing device.

7. The router device according to claim 1, wherein when the prefix is changed, a prefix storage unit stores the prefix before change and the prefix after change as a set.

8. The router device according to claim 1, wherein the RA sending unit sends the RA packet with the data indicative of deletion of one prefix and data indicative of distribution of another prefix added thereto.

9. The router device according to claim 1, wherein the RA sending unit sets "0" in a "Valid Lifetime" and "0" in a "Preferred Lifetime" of the RA packet.

* * * * *